United States Patent [19]
Metzler et al.

[11] 3,845,366
[45] Oct. 29, 1974

[54] INTEGRATED DRIVE SYSTEM

[75] Inventors: James Monroe Metzler, York; James Blockinger Forman, Red Lion, both of Pa.

[73] Assignee: Fincor, Inc., York, Pa.

[22] Filed: Apr. 12, 1973

[21] Appl. No.: 350,448

Related U.S. Application Data

[63] Continuation of Ser. No. 165,110, July 22, 1971, abandoned.

[52] U.S. Cl. .................................................. 318/99
[51] Int. Cl. ............................................ H02p 1/54
[58] Field of Search ..................... 318/98, 99, 100

[56] References Cited
UNITED STATES PATENTS
3,412,301  11/1968  Mead et al. ............................ 318/99
3,551,775  12/1970  Safiuddin ......................... 318/98 X

*Primary Examiner*—Gene Z. Rubinson

[57] ABSTRACT

An electronic control system adapted to control at least two mechanically coupled DC motors comprising control means whose input is connected to an AC source and whose output is connected for electrically controlling a semiconductive switching logic means and a motor speed logic means, a reference circuit means connected to said switching logic means and said motor speed logic means, said reference circuit means connected to a variable DC voltage generating means adapted to apply a variable DC voltage to said motors, said reference circuit means adapted to combine a signal representative of the counter EMF in the armatures in said motors, a reference voltage signal as generated by said motor speed logic means, and a signal representative current in said armatures, to generate an error signal representative of said motor's performance with respect to a reference output torque and speed.

1 Claim, 3 Drawing Figures

_3,845,366_

INTEGRATED DRIVE SYSTEM

This is a continuation, of application Ser. No. 165,110, filed July 22, 1971, now abandoned.

BACKGROUND OF THE INVENTION

This invention relates to a control system particularly adapted to simultaneously control a number of mechanically coupled drive motors, such as motors used in driving a printing press.

In the past, press drive control systems were cumbersome to install and difficult to maintain. Additionally, when a mechanical or electrical malfunction occurred in the prior art control systems, their diagnosis required extensive downtime. In fact, the problem of reliability and system response time was a matter of continuing concern for the owners and operators of the prior art multi-motor press drive systems.

SUMMARY OF THE INVENTION

Accordingly, it is a primary objective of the present invention to provide a control system adapted to control at least two mechanically coupled DC motors comprising control means whose input is connected to an AC source and whose output is connected for electrically controlling a semiconductive switching logic means and a motor speed logic means, a reference circuit means connected to said switching logic means and said motor speed logic means, said reference circuit means connected to a variable DC voltage generating means adapted to apply a variable DC voltage to said motors, said reference circuit means adapted to combine a signal representative of the counter EMF in the armatures in said motors, a reference voltage signal as generated by said motor speed logic means, and a signal representative current in said armatures, to generate an error signal representative of said motor's performance with respect to a reference output torque and speed.

It is yet another object of the present invention to provide a multi-motor DC drive system having solid state switching logic and system feed back signal generating systems.

It is still another object of the present invention to provide a control system adapted to simultaneously control a number of mechanically coupled DC drive motors of a printing press in which the system has a markedly improved response time over the prior art control systems.

It is yet another object of this invention to provide a control system adapted to maintain load sharing at a predetermined level between the various motors being controlled by the system.

Still another object of the present invention is to provide a multi-motor DC drive system which is inexpensive to manufacture and install and relatively easy to maintain.

An embodiment of the control circuit according to the concept of the present invention is shown by way of example in the accompanying drawings without attempting to show all of the various forms and modifications in which this invention might be embodied; the invention being measured by the appended claims and not by the details of the specification and drawings.

BRIEF DESCRIPTION OF THE DRAWINGS

Referring now to FIG. 1 wherein there is provided a simplified block diagram of a control system 10 in accordance with the present invention. The control system 10 is particularly adapted to simultaneously control a number of mechanically coupled drive motors of a printing press. The motors may be mechanically coupled through a common shaft, that is, they may share a common shaft or they may be mechanically coupled through appropriate gearing and clutch means. The control system 10 may be provided with control means such as push bottoms 12 in a printing press application. The control means may be provided with push botton positions safe, ready, faster, slower, inch and stop. The aforementioned positions may all be associated with the switching logic circuit 14 and with the motor speed logic 16. The switching logic circuit may comprise a number of digital switching integrated circuits. The motor speed logic 16 may be a motor drive potentiometer.

Figure 1:
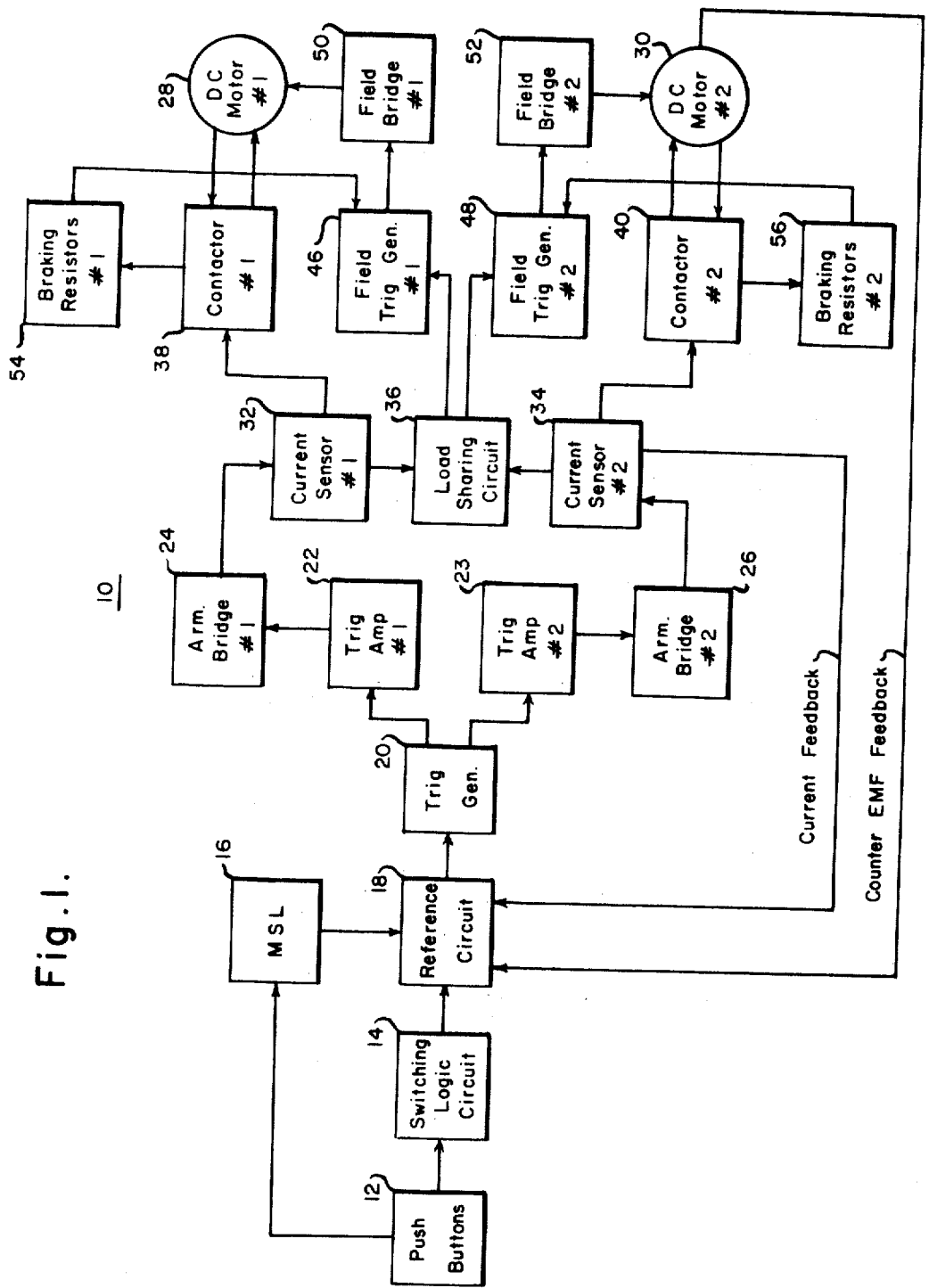
FIG. 1 is a simplified block diagram of a control system adapted to simultaneously control a number of mechanically coupled drive motors in accordance with the present invention.

The control system is also provided with a reference circuit 18 which is adapted to combine several signals in a manner to be later described. Under appropriate conditions it provides an output signal to energize the trigger generator 20. The trigger generator in turn provides a variable width pulse synchronized with the power line frequency. This pulse is provided to the trigger amplifiers 22 and 23 and the synchronized variable pulse is then amplified and supplied by the amplifiers 22 and 23 to each of their respective armature bridges 1-24 and armature bridge 2-26. The armature bridges 24 and 26 are adapted to provide a variable DC output voltage to the armatures (not shown) of their respective DC motors 1-28 and 2-30. The motors of the system are mechanically coupled as for example, they may share a common drive shaft.

The system 10 may also be provided with current sensors 1-32 and current sensors 2-34, the load sharing circuit 36, contactors 138, contactors 2-40 and breaking resistors 1-54, breaking resistors 2-56, field trigger generators 1-46, field trigger generators 2-48, field bridge 1-50 and field bridge 2-52. The function of these circuit components will be as later defined and described.

It should be noted at this point that the system 10 is adapted to simultaneously control a number of motors and these motors may be of like or different horsepower.

As before mentioned, the reference circuit 18 is adapted to combine several signals. One of these signals is the counter EMF feedback signal which, of course, is derived from the counter EMF in the respective motor armatures of DC motors 1-28 and 2-30. This signal may be selected by appropriate switching means (not shown) from either motors 1-28 or 1-30 at any one time. The counter EMF feedback signal is directly proportional to the motor speed of rotation. The signal is inputted to the reference circuit 18. The reference circuit 18 also has inputted to it the reference voltage signal of a motor speed logic 16. Also inputted to the reference circuit 18 is the current feedback signal which is derived from the armature current in the respective motor armatures of DC motors 1-28 and 2-30. This signal is likewise selected by appropriate switching means (not shown) from the same motor as the before mentioned counter EMF signal. The current feedback signal is directly proportional to the output torque of the respective motors 1-28 or 2-30. The reference circuit 18 will compare these signals and thereby produce an "error" signal which is indicative of the selected motors performance with respect to output torque and speed.

Assume for example that motors 1-28 and 2-30 are both running at less then the desired setting of the motor speed logic 16, the counter EMF signal generated by the armature of the selected motor will thereby be of a decreased value. The reference circuit 18 will compare the counter EMF signal with the motor speed logic 16 signal and the difference or error between the two signals will comprise the "error" signal. The error signal will then cause an increase in the width of the pulse of the trigger generator 20. The trigger generator is coupled with the individual amplifiers 22 and 23 which amplify and supply the pulse to their respective armature bridges 1-24 and 2-26. The so increased DC output voltage causes a corresponding increase in the motor's speed. The increased speed of the motors 1-28 and 2-30 will in turn cause a corresponding increase in the counter EMF feedback voltage and will tend to cancel out the error or difference between the counter EMF signal and the motor speed logic signal. This will thereby achieve motor speed regulation, motor speed regulation being, of course, a critical factor in driving a printing press.

It should be noted that the system 10 in accordance with the present invention utilizes only one trigger generator 20. This unique circuit configuration enables the system 10 to maintain equal armature voltages in all motors being controlled thereby. This is important for insuring that each motor within the system 10 shares its proportionate load. The load of course may be distributed equally or in such other fashion as determined by the requirements of the system 10. Load sharing is also a critical factor in driving the motors of a press.

As mentioned before, the system 10 is provided with current sensors 1-32 and 2-34 which are adapted to sense the amount of current flowing to the armature of the DC motors 1-28 and 2-30 respectively. The current sensors 1-32 and 2-34 generate signals representative of the aforementioned current magnitudes. These signals being inputted to the load sharing circuit 36. By way of analogy it may be said that the load sharing circuit 36 performs a comparing function similar to that of the reference circuit 18. Also by way of analogy the field trigger generators 1-46 and 2-48 perform a variable pulse width producing function similar to trigger generator 20. The load sharing circuit 36 compares the output signals of the current sensors 1-32 and 2-34 to determine if there is any difference or error between motor armature currents 1-28 and 2-30. If there is any such difference, this will mean that one of the armatures of the motors 1-28 or 2-30 is drawing more current than its counterpart armature. This condition would be indicative of an unbalanced torque sharing as between the two motors. Assuming for example that the armature of motor 1-28 is drawing more current than the armature of motor 2-30, which could be caused by several reasons such as different motor characteristics, for example air gap or bearing tolerances, and the like. The resultant signal thereby produced will cause an increase in the DC output voltage of the field bridge 1-50. The field bridges 1-50 and 2-52, of course, being adapted to provide a variable DC voltage to the field winding of the motors 1-28 and 2-30. At the same time the error signal produced by the load sharing circuit 36 may also be used to reduce the DC output voltage of the field bridge 2-52 to equalize the load between the motors 1-28 and 2-30. This is true for it is well known that the output torque of the DC motor will be proportional to the current flowing in its armature. This current being determined by the effective armature voltage which in turn is determined by the level of the field voltage. It can be seen therefore that the desired load sharing between motors 1-28 and 2-30 will be maintained by the interaction of current sensors 1-32 and 2-34 and the load sharing circuit 36.

The system 10 may also have provision for constant torque dynamic breaking which is important in printing press applications. Such an approach allows the various moving parts of the press to break evenly which reduces wear and tear on the parts and ensures that the web of paper in the press will not tear or part during the breaking operation. This is accomplished by first energizing the contactors 1-38 and 2-40 such that the breaking resistors 1-54 and 2-56 are switched across the respective armatures of motors 1-28 and 2-30. There will be no current flowing from the armature bridges 1-24 and 2-26 to the armatures of the motor 1-28 and 2-30. However, current will be generated by the generator action of the armatures of the motors 1-28 and 2-30 and it will be dissipated at a constant rate in the breaking resistors 1-54 and 2-56. the current flowing to the breaking resistors 1-54 and 2-56 will be maintained at a constant level until the rotation of the armatures is virtually stopped. A voltage signal of the representative armature voltage is inputted to the field trigger generators 1-46 and 2-48 from the breaking resistors 1-54 and 2-56. This signal will increase the field bridges 1-50 and 2-52 output voltage which will tend to keep the generated voltage substantially constant. If this voltage is maintained substantially constant then the armature current will also be maintained at a substantially constant level, thereby maintaining substantially constant torque during the breaking cycle. It can be seen therefore that the above described system will maintain the mechanically coupled DC motors in a regulated speed and torque mode throughout the motor's operational and breaking cycle.

Figure 2:
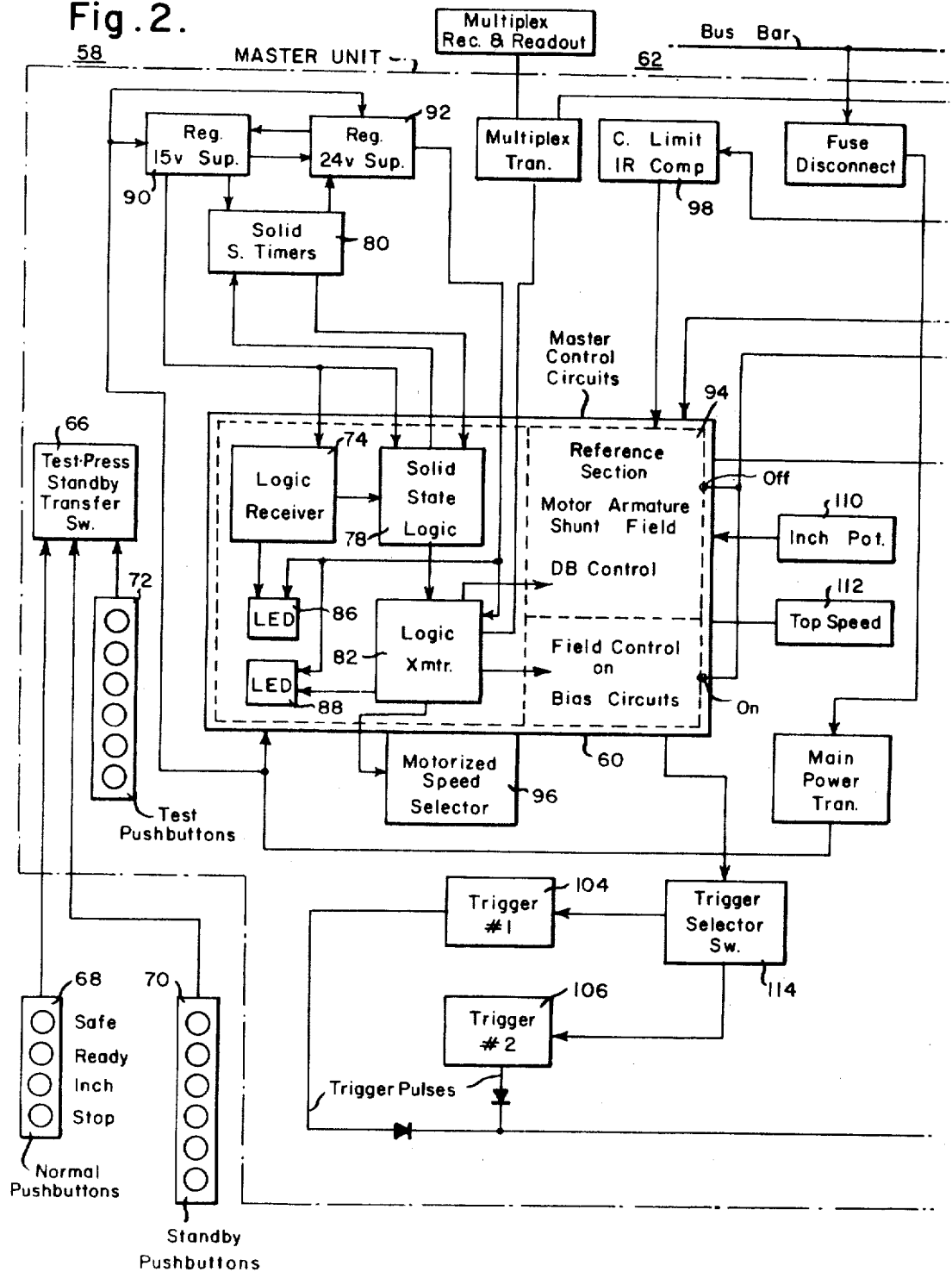
FIGS. 2 and 2a are expanded block diagrams having some schematic features of the control system of FIG. 1.
Figure 2A:
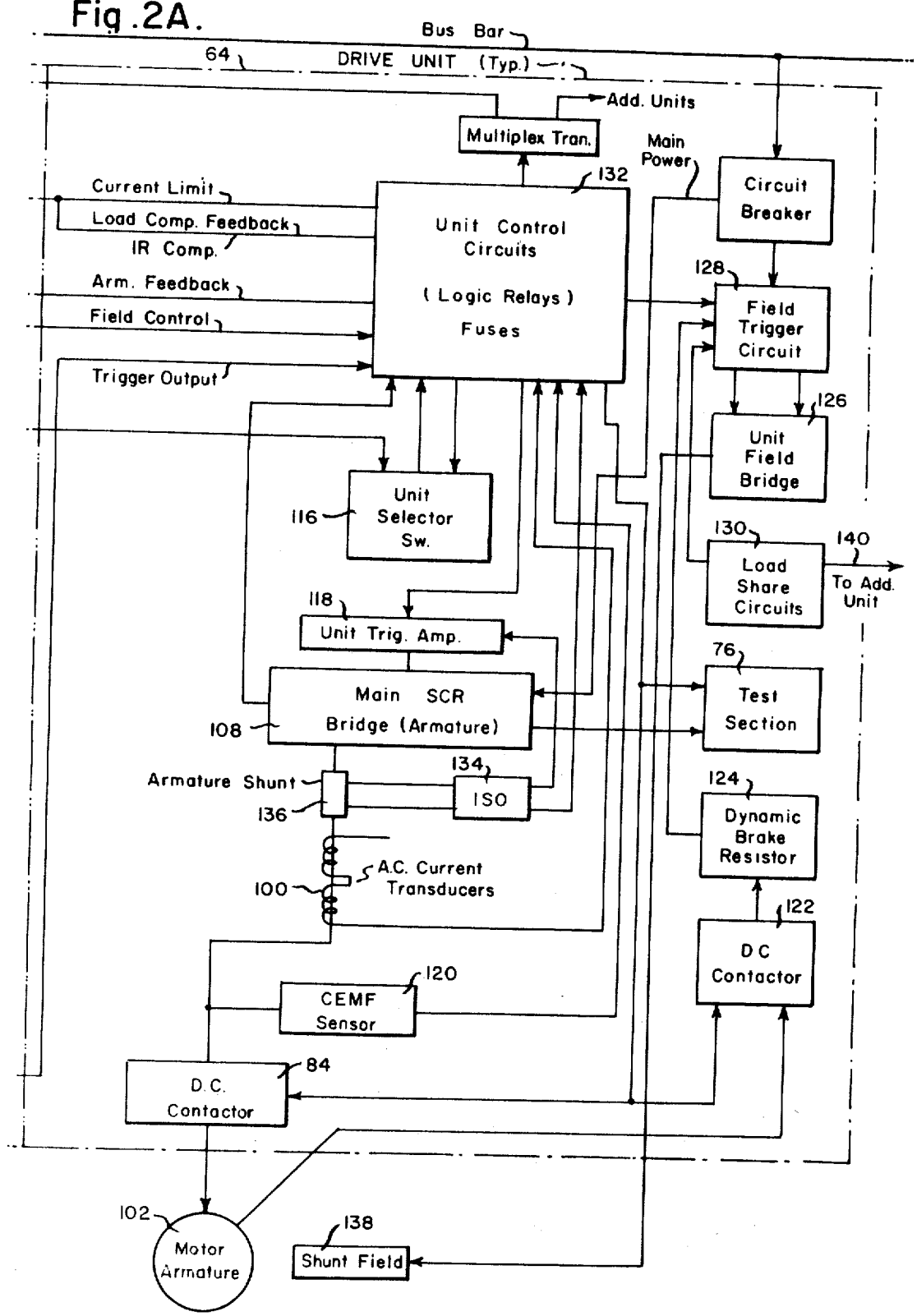

Referring now to FIG. 2 wherein there is shown an expanded block diagram of a control system 58 in accordance with the present invention. The control system 58 is particularly adapted to simultaneously control a number of mechanically coupled drive motors of a printing press. The control system 58 may be provided with control means such as push buttons. The push buttons may be of a commercially available variety and comprise sets of normal push button 68, standby push buttons 70 and test push buttons 72. The control system 58 may be separated essentially into two units. A master unit 62 and a drive unit 64. In a typical press application there would be one master unit 62 centrally located such as on the frame of the folding unit (not shown) or apparatus. There would be a number of drive units 64, one for each drive motor. The drive unit 64 may be positioned on and attached to the printing press units. In a printing press application the control means or push buttons 68, 70 and 72 may be provided with a stop position, an inch position, a slower position and a faster position. The push buttons 68, 70 and 72 are associated with a push button transfer switch 66. This switch is adapted to select one of three positions mainly, test, press, or stand by. In the press position the entire system 58 functions in its normal mode. In the test position the motors to be later described are disconnected from the drive unit 64. The output of the main SCR bridge 108 is connected to a test load 76 for static testing of the drive unit 64, and the master unit 62. In the stand-by position all of the normal push buttons 68 are isolated from the remaining portions of the systems 58. This allows the controlling of the system from a position remote from the area in which the normal push buttons 68 are located, that is, the system 58 may be controlled from the stand-by stations. The test-press, stand-by, transfer, switch 66 may be of typical commercial manufacture such as a two pole section type JK switch as manufactured by the Electro-Switch Corporation. The output signals of the test-press, stand-by, transfer switch 66 is inputted to the logic receiver 74. These logic signals may be in the form of 115 volt AC switched signals. Logic receiver 74 is essentially a grouping of relays which are operably responsive to the aforementioned 115 volt AC switching signal and whose contacts are connected to a 15 volt bus. Circuit isolation is achieved in logic receiver 74 which greatly enhances noise immunity and suppression. A relay which forms a part of the logic receiver 74 may be connected to provide 15 volts output when the contacts of the relay are closed. This condition may represent a logic state of one. When the contacts of this relay are open this may be given a logic state zero. Accordingly these logic levels of zero and one form the inputs to the solid state logic 78. 115 volt AC inputs from the transfer switch 66 may be composed of the following signals which may be representative of the typical operational mode of a printing press, namely, stop, safe-ready, inch, faster, inch/faster (two button run), slower, plate position, plate position correct, pre-set increase and pre-set decrease. In the solid state logic section 78, the switch or push button 68, 70 or 72 commands inputted from the logic receiver 74 are monitored and the logical output commands are then generated. For example, if an inch command is initiated by actuating an inch push botton located on the push button stations 68, or 70, the press will be inched forward provided that the circuit path will permit that particular command to progress through the various logic gates. The solid state logic section 78 thus performs the switching logic decisions normally performed by switching logic relays. This application permits a smaller, lighter, faster and more reliable logic control system. The solid state logic 78 performs these functions in such a manner that following switching priorities are achieved.

Stop — A stop command will override all other functions and commands and will cause the circuits of the solid state logic 78 to electronically assume their initial or starting conditions.

Safe Command — When the press apparatus is at a standstill this command will override or preempt all other functions and commands except that of the stop command. However, when the press is in a run condition a safe command will lock the speed of the press drive motors at that speed point. Thus, the speed of the motors cannot be increased beyond that particular speed point until the safe command is removed.

Faster or pre-set increase command — A faster or pre-set increase command results in increasing the press speed. A slower or pre-set decrease command will override a faster or pre-set increase command. It should be mentioned, however, at this point that the logic circuitry of the solid state logic 78 could be so provided to establish other switching priorities or for that matter additional priorities could also be added. The actual specific implementation of the switching priorities is well within the current state of the art and can be achieved by many suitable commercially available switching logic circuit configuations. The zero and 15 volt DC signals or full level logic signals must be converted back to a 115 volt AC level in order that the switching relay coils for example the DC contactors 122 and 84 can be operated. This transfer or conversion of the logic level is accomplished in the logic transmitter 82. Essentially this section is made up of a number of small relays of low voltage coils which can be operated by the aforementioned low level logic signals. The contacts of these small relays in the logic transmitter 82 are adapted to switch 115 volt AC coils of the relatively large powered control relays used throughout the system 58 such as motor contactor 84 and 122. Part of the solid state logic 78 and logic transmitter 82 is the solid state timer 80. Various time delay signals are generated in the solid timer section 80. These time delay signals control the various functions of the control system 58. For example, these signals may be used to operate warning bells and lights (not shown). An inch command will cause these bells to ring or the appropriate lights to flash for a set period. During this set period the press cannot move. If this command was removed during the set-period the period will continue to run. The various input and output signals of the solid state logic 78 and logic transmitter 82 energize a series of light emitting diodes 86 and 88. The input light emitting diode indicator 86 may be visually monitored during the operation of the control system 58 to determine if the system is properly functioning. The input light emitting diode indicator 68 is associated with and may be used to monitor the functioning of the logic receiver 74. The output light emitting diode indicator 88 is associated with and monitors the function of the logic transmitter 82. Operating voltage for the logic receiver 74, logic transmitter 82, solid state logic 78, solid state timer 80, input light emitting diode indicator 86, output light emitting diode indicator 88, are all provided by 15 volt regulated power supply 90 and 24 volt regulated power supply 92. These circuits are interlocked in such a manner that if any circuit board comprising any of the aforementioned circuits are removed from that particular circuit during operation, then all operating potentials are automatically removed. Outputs from the logic transmitter 82 are fed to the reference section 94 along with the following:

A. Motorized speed selector 96 — The motorized master switch or speed selector 96 is controlled by a DC pilot motor (not shown) which may have an adjustable rate of acceleration and deceleration of 50–60 seconds from so called thread speed of the printing press to the top speed of the press. On a stop command the pilot motor of the motorized speed selector 96 will return to a predetermined minimum speed value within a specified period of time such as 15 seconds. The motorized speed selector 96 may also be controlled by hand in case of the pilot motor malfunction. Adjustable cams (not shown) driven by the pilot motor operate limit switches for setting minimum and maximum travel of the motorized speed selector 96 and necessary press interlocks. Reference signal inputs from the adjustable inch speed potentiometer 110 and top speed potentiometer 112 are provided on the motorized speed selector 96 for input to the reference section 94.

B. Current limit and IR compensation circuit 98 — Any overcurrent in the DC line to the motor armature 102 is sensed in the current transducer 100. When higher than normal loading occurs as may be caused by heavier ink, limit circuit 98 diverts a portion of the control current to the master trigger circuit 104. This will reduce the control current to the triggers 104 and 106 lowering the output voltage of the SCR bridge 108. This action will limit the motor armature current to a predetermined value. If the control system 58 is in a run mode or condition, the signal imputted to the reference section, namely, the signals generated by the logic transmitter 82, the motorized speed selector 96 and the current limit and IR compensation circuit 98 will be processed by the reference section 94 such as to provide a control signal proportional to the above mentioned input signals. The generated control signal is inputted to trigger 104 or trigger 106 depending upon the position of trigger selector switch 114. The selected trigger 104 or 106 will produce a variable width pulse which is coupled to all of the drive units 64 which are selected by the position of the unit selector switch 116 to the appropriate master unit 62. Assuming the unit controller 64 is selected by the unit selector switch 116 to the master controller, the variable width gate pulse will be inputted to the unit trigger amplifiers 118, one for each drive unit 64. The variable width pulse is amplified and isolated from the master controller 62. The armature bridge 108 then receives these pulses and the SCR's in the armature bridge are "turned on" and the armature voltage is supplied to the motor armature 102. This same voltage is present on the counter EMF sensor 120 which consists of a voltage divider network. Here a certain amount of voltage is "tapped off" and used to cancel a portion of the control signal from the reference section 94. This will result in stable speed control or regulation. The armature bridge 108 consists of three silicone control rectifiers and three silicone rectifiers which supplies the output voltage to the motor armature 102. The trigger pulses of the triggers 104 or control outputs of the SCR's in the armature bridge 108, which in turn regulates the amount of voltage supplied to the motor armature 102. The freewheeling rectifier (not shown) is connected across the output of the armature bridge 108 providing a path for armature inductance current when the SCR's of the armature bridge are controlling the motors at a slow speed. As mentioned before the armature bridge 108 consists of diodes and three silicone controlled rectifiers. They are connected in a standard bridge configuration when the aforementioned freewheeling diode connected across its output. The motor contactor 84 allows power to be applied to the motor armature 102 in accordance with the system demands. When the dynamic breaking contactor 122 is energized, its contacts will close the circuit connecting dynamic breaking resistor 124 across the motor armature 102. At the same time the field trigger circuit 128 provides the proper amount of turn on signal to the SCR's that have controlled the field voltage in the shunt field 138. As the voltage in the motor armature 102 decreases, the control current will decrease thus increasing the "turn on" signal to the SCR's in the field bridge 126. This will in turn increase the voltage to the shunt field 138, thus, as the motor armature speed decreases, the breaking torque will be held approximately constant due to the increase of the shunt field voltage in the shunt field 138.

The field trigger pulse generator 128 and the field bridge 126 control the voltage in the shunt field 138 and they have two functions. The first function is to cause all the motors 102 of the respective drive units 64 running under the control of the master unit 62 to share their respective loads equally. Secondly, trigger 128 enables or allows the press operator to adjust the level of field voltage of the shunt field 138 of the various motors of the drive units 64. This may be accomplished by providing an off bias to the field trigger 128, which in turn decreases the conduction period of the SCR's in the unit field bridge 126.

A load sharing signal is supplied from the current transducer 100 and is rectified and inputted to the load sharing bus 140 which is common to each of the drive units 64. It should be noted here that the current transducer 100 is provided as a means of sampling the current in the motor armature 102 for use in the load sharing circuit 130.

Provided all the motor armatures 102 are experiencing equal loads, the voltages produced and impressed upon the load sharing bus 140 will be of equal value and accordingly there will be no correction or error signal fed to the unit field trigger 128. Assuming one of the motor armatures 102 loaded somewhat less than the motor armatures of the other drive units 64. The current transducers 100 as noted above are sampling the current in the motor armatures 102. At the same time the transducers 100 will produce a voltage lower than the voltage supplied to the load sharing bus 140 by the other transducers 100 of the other drive units 64 as a result the current will be caused to flow in the field trigger 128 associated with the lightly loaded motor 102 in such a direction that its field voltage will weaken bringing the motor armature current up such that the lightly loaded motor will then assume its appropriate share of the load.

In a similar manner load sharing will also be accomplished when one of the motors 102 is sharing a greater load than its counterpart motor 102 of the drive units 64. This will be accomplished as above except that the field voltage of the motor sharing the excessive load will be increased until it assumes its proportionate share of that load.

Field control "on" bias circuits 60 receive inputs from the logic transmitter 82. At a press standstill condition, that is, none of the mechanical parts of the press moving, the field control on bias circuit 60 will provide an "on" signal to all of the selected drive units 64, field trigger circuits 128 via the unit selector switch 116. For example, this on signal will produce an output which in turn produces approximately 180 volts DC on the shunt field 138 of the particular motor within the selected drive unit 64, the 180 volt DC is applied to the shunt field 138 from the unit field bridge 126. When a run or inch condition is initiated by the control means 68, 70 or 72, a signal is inputted from the logic transmitter 82 into the field control "on" bias circuit 60 which results in an additional "on" signal to all the selected field trigger circuits 128. This will result in approximately 240–260 volts DC on the shunt field 138 of the selected motor 102 from the field bridges 126. When a "stop" function is initiated by the control means and a signal from the logic transmitter 82 is then inputted to the field control "on" bias circuit 60. This input will result in an additional "on" signal to all of the selected drive units 64, field trigger circuits 128, resulting in approximately 300 volts DC on the shunt field 138 of the motors involved from their respective field bridges 126. In addition, a signal is inputted into the field trigger 128 from the dynamic breaking resistors 124. The combination of these signals in the field trigger circuit 128 will control the output voltage of the unit field bridge 126 so that the motor provides constant torque breaking as previously described.

Assuming the motors 102 are running with rated voltage applied depressing a faster push button of the control means 68, 70 and 72, causes an increase in the signal from the motorized speed selector 96 this signal is inputted into the reference section 94. This additional signal provides an off signal through the field trigger circuits 128 causing a reduction in the voltage in the shunt field 138. This will result in an increase speed of the motor 102. It being well known that field weakening will cause the speed of a DC motor to increase.

As long as a "faster" signal is supplied by the control means such as pressing the faster button, this will result in a further reduction of the voltage in the shunt field 138. This in turn will result in an increase motor speed and accordingly press speed. The speed of the motor can be increased approximately 25 percent above its rated speed by the field weakening approach. Each drive unit 64 has an instantaneous static overload circuit 134. This circuit receives its input from the armature shunt 136. If for example an overload should occur, such as may be caused by a shorted armature, faulty wiring or the like, this will result in an excessively high DC current from the SCR bridge 108. The instantaneous static overload circuit 134 detects this current demand and it generates a responsive signal which is inputted to the unit trigger amplifier 118. This signal will inhibit any additional firing of the SCR's in the armature bridge 108. This, of course, will cause a reduction in the output voltage of the armature bridge down to a zero value. A stop signal or function is initiated each time the instantaneous state overload circuit 134 is caused to function. This will result in a complete shut down of the printing press which can only be restarted by resetting the instantaneous state overload circuit. There is one ISO 134 on each drive unit 64.

Testing of the overall system 58 can be accomplished by activating the push button switch 72 and placing the selector switch 66 in its test mode. Although the control relays and logic embodied within the unit control circuits 132 associated with the drive unit 64 will operate, no power will be applied to the motors armatures 102. The armature bridge 108 and the associated components can be thoroughly checked during this testing period. The output of the armature bridge will be fed to a test load resistor 76 for energy dissipation. This test feature makes it possible to repair any malfunction in a minimum of time.

While particular embodiments of the present invention have been shown and described, it will be obvious to those skilled in the art that changes and modifications may be made from this invention without departing from its broader aspects. Accordingly, the appended claims are to cover all such changes and modifications as they fall within the true spirit and scope of the invention.

We claim:

1. An electronic control system adapted to control at least two mechanically coupled DC motors whose input is connected to an AC source and whose output is comprising control means connected for electrically controlling a semiconductive switching logic means and a motor speed logic means, a reference circuit means connected to said switching logic means and said motor speed logic means, said reference circuit means connected to a variable DC voltage generating means adapted to apply a variable DC voltage to said motors, said variable DC voltage generator means is further provided armature bridge means connected between said amplifier means and said DC motors, there being an armature bridge means for each of said motors, said armature bridge being adapted to provide a variable DC output voltage to said armatures, there being one trigger generator whose output is connected to each of said amplifier means whereby substantially equal armature voltages are maintained in said armatures in each of said motors, said variable DC voltage generating means being also provided with current sensing means connected between said armature bridge means and said armatures adapted to generate a signal representative of the current flowing to each of said armatures, and a load sharing means connected between said current sensing means adapted to maintain prescribed loading between each of said DC motors, said load sharing means is provided with load sharing circuit means which is connected between said current sensing means and a field trigger generator, said field trigger generator being connected to the output of a field bridge, the output of said field bridge being connected to the field windings of said DC motors, said reference circuit means adapted to combine a signal directly representative of the counter EMF in the armatures in said motors, a reference voltage signal as generated by said motor speed logic means, and a signal representative of the current in said armatures, to generate an error signal representative of said motor's actual speed and output torque with respect to a reference speed and output torque, said variable DC voltage generating means further includes a trigger generator whose input is connected to said reference circuit means and said output is connected to said armatures of said DC motors, said trigger generator being adapted to generate a variable width pulse synchronized with the frequency of said AC source, said variable DC voltage generator means is further provided with amplifier means connected between said trigger generator and said motors and adapted to amplify said variable width pulses, said signals generated by said current sensing means are inputted to said load sharing circuit means, said load sharing means being adapted to compare any differences between said signals and generate a signal representative of any such differences the generated signal inputted to said field trigger generator to in turn vary the DC output voltage of said field bridge to maintain a predetermined load sharing level between each of said DC motors, there being one field trigger generator and one field bridge for each DC motor in said system, there being only one load sharing circuit means it being connected to each of said field trigger generators, said variable DC voltage generating means includes a constant torque braking means switchably connected across said armature, said constant torque braking means includes braking resistors adapted to be switchably connected by a contacting means, across said armature to dissipate, at a constant rate, the current flowing in said armature by the generator action of said motors during the braking cycle, said braking resistors generate a signal during the braking cycle representative of the voltage in said armature, said signal being inputted to said field trigger generators to maintain voltage generated during the braking cycle substantially constant.

* * * * *